May 26, 1953  E. E. STRIEF  2,639,721
HYDRAULIC SERVO MECHANISM
Filed Dec. 26, 1951
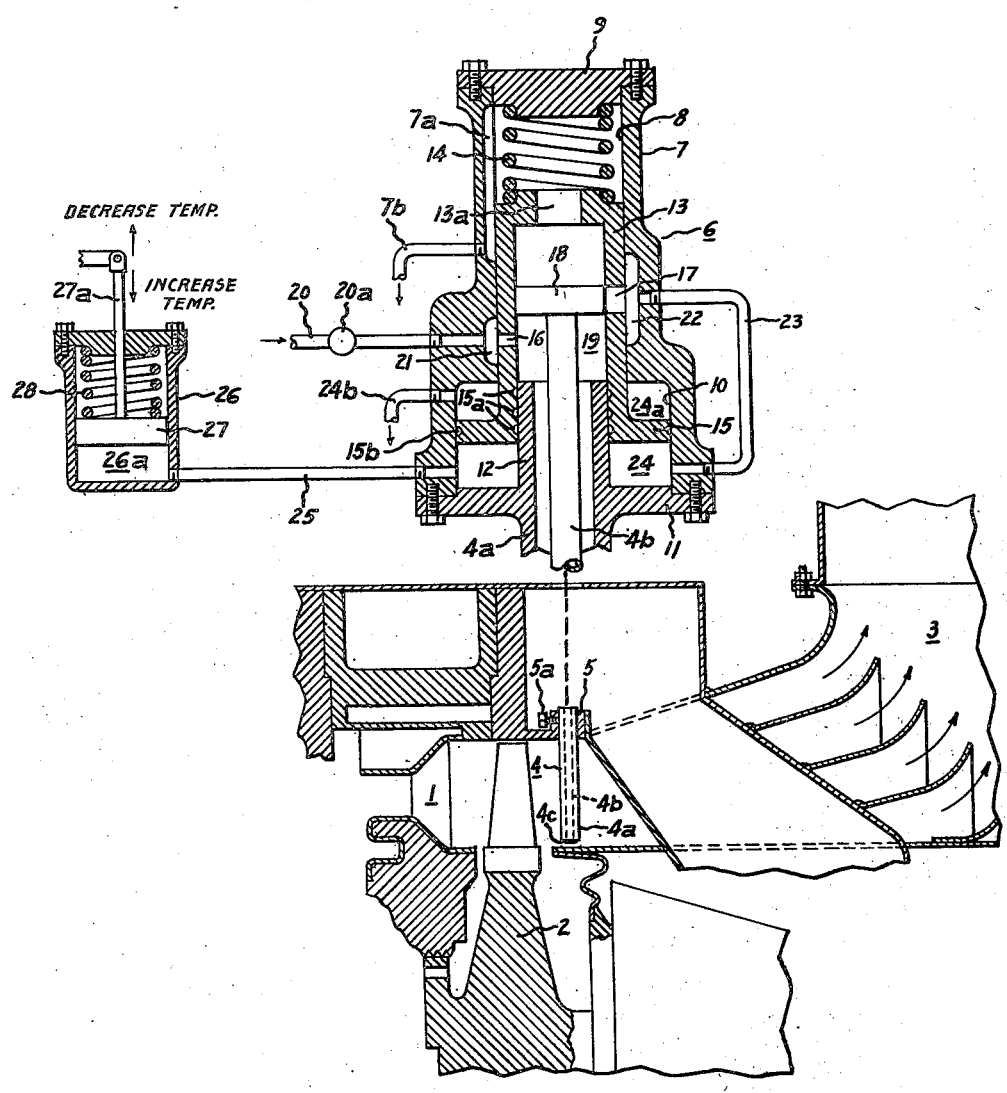
Inventor:
Eugene E. Strief,
by Richard E. Hosley
His Attorney.

Patented May 26, 1953

2,639,721

UNITED STATES PATENT OFFICE 2,639,721

HYDRAULIC SERVO MECHANISM

Eugene E. Strief, Denver, Colo., assignor to General Electric Company, a corporation of New York Application December 26, 1951, Serial No. 263,437

2 Claims. (Cl. 137—85)

This invention relates to fluid pressure servo mechanism, particularly to a servo device for amplifying small displacements in an indicating or regulating system. The specific form of the invention described herein is a temperature indicating or controlling mechanism, specially intended for use in gas turbine powerplants, in which a hydraulic servo is used to amplify the differential thermal expansion of a temperature sensing element.

Since the motive fluid temperatures in a gas turbine powerplant are well above 1000° F., many problems have been encountered in procuring satisfactory devices for sensing the temperature and amplifying the temperature responsive signal so that it can be used to modify the operation of the fuel system of the powerplant to prevent excessive temperatures, etc.

The purpose of the present invention is to provide improved fluid pressure servo mechanism for converting the comparatively small movement of a differential thermal expansion type of temperature sensitive element into an amplified displacement which can be used to modify the operation of the regulating system supplying fuel to the powerplant.

Other objects and advantages will become apparent from the following description taken in connection with the accompanying drawing, in which the single figure shows diagrammatically a gas turbine powerplant having the motive fluid temperature sensed by a differential thermal expansion device, with a hydraulic servo incorporating the invention for amplifying the relative displacement occurring in the differential thermal expansion device.

The invention is practiced by providing a pilot member connected to be positioned by the temperature responsive element, the pilot sliding in a bushing which has a piston end portion subjected to the pressure of the operating fluid admitted through the pilot. This pressure tends to bias the bushing against a compression spring, so that an increasing output pressure is required to maintain the bushing in equilibrium condition against the bias of the spring as the input displacement increases. Thus the output signal pressure will bear a preselected relation to the input displacement, and can be employed to effect a proportional output displacement.

Referring now more particularly to the drawing, the invention is shown as applied to a gas turbine powerplant, only a portion of which is shown diagrammatically and in section. The turbine nozzle structure 1 supplies hot motive fluid, at a temperature above 1000° F., to a bucket-wheel 2, which discharges into an exhaust casing 3. For sensing the temperature of the motive fluid discharged from bucket-wheel 1, a differential thermal expansion device, indicated generally at 4, is provided. This comprises an outer tube 4a of a material having a very substantial coefficient of thermal expansion, and having disposed inside a tube or rod 4b of an alloy having a very much smaller coefficient of thermal expansion. These materials may be, for instance, stainless steel and carbon steel, respectively. The outer tube 4a is secured, as by welding or equivalent means, to the extreme end of the inner rod 4b, as indicated at 4c in the drawing. The outer tube is supported in the outer exhaust casing wall, as for instance by means of a support bushing 5 having a set screw 5a or equivalent device for securing the tube 4 in place.

It will be apparent that, due to the difference in the expansion characteristics of the outer tube 4a and the inner rod 4b, an increase in temperature of the motive fluid will cause the outer tube to expand, pulling the rod 4b downwardly, while a decrease in temperature will cause outer tube 4a to contract and push rod 4b upwardly.

This differential thermal expansion between the members 4a, 4b is amplified by the hydraulic servo means shown to an enlarged scale at 6. This comprises an outer housing 7 defining a central longitudinal bore 8 closed at the top by an end cap 9. The opposite end of the housing 7 defines an enlarged cylinder 10 having an end closure 11 which may be conveniently formed integral with or secured to the outer expansion tube 4a. The lower end plate 11 also has formed integral therewith an axially extending cylinder portion 12. Slidably disposed in the bore 8 is a bushing 13 having an open upper end engaged by a compression spring 14, and a lower end portion defining a piston 15 slidably disposed in the chamber defined between the outer wall 10 and the inner cylinder member 12. This piston may of course be provided with suitable sealing means such as the sealing grooves 15a, 15b.

The intermediate portion of bushing 13 defines an inlet port 16 and a discharge port 17, the latter adapted to cooperate with a pilot disk 18 carried on the extreme end of rod 4b. It will be understood by those skilled in the art that, when in equilibrium condition, the pilot disk 18 just blocks the discharge port 17. The inlet port 16 is always in free communication with the space 19 defined within the bushing 13 at the lower side of pilot disk 18. A suitable operating fluid at constant pressure is provided by way of an inlet conduit 20 having suitable pressure regulating means such as the constant pressure regulating valve 20a. Conduit 20 discharges into a longitudinal groove 21, designed to be in open communication with the inlet port 16 for all longitudinal positions of bushing 13.

The discharge port 17 is in free communication with an axially extending groove 22 in housing 7, for all axial positions of bushing 13. This groove communicates by way of a conduit 23 with the pressure chamber 24 defined between the piston 15, cylinder 10, and end closure 11. The fluid pressure existing in chamber 24 is communicated by conduit 25 to a suitable output device, which for purposes of illustration is shown here as comprising a hydraulic cylinder 26 having a piston 27 biased in one direction by a compression spring 28 and arranged to be positioned by the hydraulic pressure in chamber 26a against the bias of spring 28. The displacement of the piston rod 27a may be used to actuate various indicating or regulating devices. For instance, this displacement may be used as the temperature responsive input signal displacement in an exhaust gas temperature regulating mechanism as disclosed in the United States patent to N. E. Starkey, 2,528,252, issued October 31, 1950 and assigned to the same assignee as the present application.

So that any fluid leaking past piston 15 will not accumulate above the piston and prevent movement thereof upwardly, the chamber 24a is provided with a drain 24b. Operating fluid discharged from chamber 24 through conduit 23 when the pilot 18 moves downwardly, is drained through the open end 13a of bushing 13 and from the housing 7 by way of a longitudinally extending groove 7a in the inner wall thereof, this drain groove communicating with a drain conduit 7b.

The operation of this hydraulic servo will be apparent from the above description of the structure. If the exhaust gas temperature should increase, the outer tube 4a will expand, pulling inner rod 4b downwardly so that pilot 18 uncovers the port 17, with the result that fluid from chamber 24 drains through conduit 23, through the opening 13a, groove 7a and drain conduit 7b. The force of spring 14 thereupon causes bushing 13 to descend somewhat until the pilot 18 again blocks port 17. This displacement is accompanied by a decrease in the force exerted by spring 14, which force is of course just balanced by the reduced pressure now existing in chamber 24. Thus an increase in temperature of the motive fluid is accompanied by a decrease in the signal pressure in chamber 24, with the result that output piston 27 descends until the reduced force exerted by spring 28 just balances the reduced pressure in chamber 26a. Thus an increase in temperature of the turbine exhaust fluid is accompanied by a proportional downward movement of the piston rod 27a.

Conversely, upon a decrease in exhaust fluid temperature, the differential thermal expansion occurring between outer tube 4a and inner rod 4b causes the pilot disk 18 to move upwardly so as to uncover port 17 to admit operating fluid from port 16, through conduit 23 to chamber 24. The increased pressure in chamber 24 causes bushing 13 to move upwardly until pilot 18 again blocks port 17, in which condition the increased force exerted by the compression spring 14 just balances the increased pressure in chamber 24. The increased pressure is communicated to chamber 26a so that piston 27 moves upwardly. Thus a decrease in exhaust fluid temperature is accompanied by an upward movement of the piston rod 27a.

It will be obvious to those skilled in the art that, by suitable selection of the physical characteristics of springs 14, 28, and by suitable proportioning of the effective areas of pistons 15, 27, a given change in temperature of the turbine exhaust fluid can be made to effect a desired output signal movement of the piston rod 27a.

Thus the invention provides a comparatively simple hydraulic servo mechanism for producing a useful output displacement which bears a preselected relation to the comparatively small differential thermal expansion of the temperature sensing element. The simplicity of the mechanism required facilitates achievement of the degree of reliability required of such a device when used as an over-temperature preventing component in a gas turbine regulator.

While the device has been described as a hydraulic servo, it will be understood that the motive fluid may be any suitable liquid or gas under pressure.

While only one form of the invention has been described specifically herein, it will be apparent that many alterations and substitutions of mechanical equivalents may be made; and it is, of course, desired to cover by the appended claims all such modifications as fall within the true spirit and scope of the invention.

What I claim as new and desire to secure by Letters Patent of the United States is:

1. Fluid pressure servo mechanism for producing an output signal pressure proportional to an input signal displacement comprising a housing defining a longitudinal bore having an end portion of enlarged diameter, a hollow bushing member slidably disposed in said bore with an enlarged hollow piston end portion in the enlarged end portion of the bore, and end wall members for the respective ends of the housing, a hollow cylinder member secured to the larger end wall member and projecting axially into the enlarged bore portion of the housing, the piston end portion of the bushing being slidably disposed over said cylinder member with the outer circumferential surface of the piston engaging the inner wall of the enlarged bore portion whereby an output signal pressure chamber is defined between said piston, cylinder member, and the adjacent housing walls, compression spring means disposed in the smaller diameter opposite end portion of the housing bore to bias the bushing against the pressure existing in said signal pressure chamber, an input displacement member disposed within said cylinder member and having on the end thereof a pilot disk member slidably disposed in the central bore of the bushing, the bushing defining a first port in one side wall portion thereof for admitting pressure fluid to the chamber defined by the pilot disk and said cylinder member, the end of said bushing remote from the piston defining a second drain port, said bushing having a second side wall portion defining a third port adapted to be covered by the pilot disk when in equilibrium condition, conduit means communicating fluid from said third port to said signal pressure chamber, the housing defining drain ports for removing fluid from the enlarged bore portion of the housing at the opposite side of the piston from said signal pressure chamber and from said second port, whereby movement of the input displacement member in one direction causes the pilot member to admit operating fluid to the signal pressure chamber to bias the piston against the compression spring until the increased force exerted by the spring balances the increased pressure in the signal pressure chamber and the pilot disk again covers said third port, whereas movement of the input displacement member in the opposite direction causes the pilot disk to uncover the port to effect drainage of fluid from the signal output pressure chamber through said drain ports in the bushing end portion and housing until the reduced pressure in the signal pressure chamber causes the spring to move the bushing so the third port is again aligned with the pilot disk.

2. Fluid pressure servo mechanism for producing an output signal pressure proportional to an input signal displacement comprising a housing defining a longitudinal bore having an end portion of enlarged diameter, a hollow bushing member slidably disposed in said bore with an enlarged hollow piston end portion in the enlarged end portion of said bore, end wall portions forming closures for the respective ends of the housing, a hollow cylinder member secured to the larger end wall member and projecting axially into the enlarged bore portion of the housing, the piston end portion of said bushing being slidably disposed over said cylinder member with the outer circumferential surface of the piston engaging the inner wall of the enlarged bore portion whereby an output signal pressure chamber is defined between said piston and cylinder member and the adjacent walls of the housing, compression spring means disposed in the smaller diameter opposite end portion of the housing bore and biasing the bushing against the pressure existing in the signal pressure chamber, an input displacement member disposed within said hollow cylinder member and having at the end thereof a pilot disk member slidably disposed in the central bore of the bushing, the bushing defining a first port for admitting pressure fluid to the chamber defined within the bushing between the pilot disk and said cylinder member, the end of the bushing remote from the piston defining a second port communicating with a drain opening in the housing, the bushing having a side wall portion defining a third port adapted to be covered by the pilot disk when in equilibrium condition, conduit means communicating fluid from said third port to said signal pressure chamber, whereby movement of the input displacement member in one direction causes the pilot disk to admit operating fluid to the signal pressure chamber to bias the piston against the compression spring until the increased force exerted by the spring balances the increased pressure in the signal pressure chamber and the pilot disk again covers the third port, whereas movement of the input displacement member in the opposite direction causes the pilot disk to uncover the third port to effect drainage of fluid from the signal output pressure chamber through said second port until the reduced pressure in the signal pressure chamber causes the spring to move the bushing so the third port is again aligned with the pilot disk.

EUGENE E. STRIEF.

References Cited in the file of this patent

UNITED STATES PATENTS

| Number | Name | Date |
| --- | --- | --- |
| 1,684,075 | Schwendner et al. | Sept. 11, 1928 |
| 2,312,671 | Otto | Mar. 2, 1943 |
| 2,528,252 | Starkey | Oct. 31, 1950 |